United States Patent [19]

Carlson

[11] Patent Number: 5,246,788
[45] Date of Patent: Sep. 21, 1993

[54] VINYL CHLORIDE AND HETEROCYCLIC THIONE FUNCTIONAL POLYURETHANE POLYMER BLENDS AND THEIR USE IN MAGNETIC RECORDING MEDIA

[75] Inventor: James G. Carlson, Lake Elmo, Minn.

[73] Assignee: Minnesota Mining and Manufacturing Company, St. Paul, Minn.

[21] Appl. No.: 800,452

[22] Filed: Nov. 26, 1991

[51] Int. Cl.$^5$ ............................................. C08G 18/60
[52] U.S. Cl. .................................. 428/694 B; 525/452; 525/131; 524/431; 428/900; 428/431
[58] Field of Search ................ 525/452, 131; 428/900, 428/431, 694; 524/431

[56] References Cited

U.S. PATENT DOCUMENTS

| 3,255,146 | 6/1966  | Schlemann et al.  | 260/32.6 |
| 4,152,485 | 5/1979  | Mizumura et al.   | 428/425 |
| 4,329,475 | 5/1982  | Rothgery          | 548/141 |
| 4,707,410 | 11/1987 | Hata et al.       | 428/413 |
| 4,707,411 | 11/1987 | Nakayama et al.   | 428/413 |
| 4,731,292 | 3/1988  | Sasaki et al.     | 428/425.9 |
| 4,784,907 | 11/1988 | Matsufuji et al.  | 428/328 |
| 4,784,914 | 11/1988 | Matsufuji et al.  | 428/418 |
| 4,786,557 | 11/1988 | Kakuishi et al.   | 428/418 |
| 4,816,683 | 3/1989  | Marsden           | 250/385.1 |
| 4,837,082 | 6/1989  | Harrell et al.    | 428/329 |
| 4,985,314 | 1/1991  | Merriam et al.    | 428/694 |
| 5,069,807 | 12/1991 | Ohkubo            | 252/62.54 |
| 5,081,213 | 1/1992  | Carlson           | 525/452 |

FOREIGN PATENT DOCUMENTS

| 837489    | 3/1976  | Belgium . |
| 0311935   | 6/1988  | European Pat. Off. . |
| 60-138540 | 7/1985  | Japan . |
| 62-73417  | 4/1987  | Japan . |
| 1-116088  | 5/1989  | Japan . |
| 1-116089  | 5/1989  | Japan . |
| 1-182364  | 7/1989  | Japan . |
| 1-282726  | 11/1989 | Japan . |
| 1-319122  | 12/1989 | Japan . |
| 757987    | 12/1975 | South Africa . |

OTHER PUBLICATIONS

Heterocycles vol. 11, 1978 pp. 121-132 Spectral and Magnetic Studies, Manuscript Dec. 5, 1980.
Indian Journal of Chemical Science vol. 1, 1987 37-39.
CA 111:223544s.
CA 111:223545t.
CA 103:224434c.
ACS CA 113(2):16758r.
ACS CA 106(12) 86353j.
ACS 2349-67-9 5 Amino 1,3,4 thiadiazole-2 thiol.
Copending U.S. Application Ser. No. 07/635,858.
Copending U.S. Application Ser. No. 07/751,334.
Chemical Abstracts 9th Collective Index—Thiones.
Heterocycles vol. II, pp. 121-132, 1978, N Nuclear Magnetic Resonance Spectroscopy of Some Nitrogen Heterocycles, Williamson and Roberts.

Primary Examiner—James J. Seidleck
Assistant Examiner—Mary Critharis
Attorney, Agent, or Firm—Gary L. Griswold; Walter N. Kirn; Janice L. Dowdall

[57] ABSTRACT

The invention relates to a composition comprising:
(a) about 5 to 95 weight percent of a vinyl chloride copolymer; and
(b) about 5 to about 95 weight percent of a polymer selected from the group consisting of polyurethane and polyurethane urea, said polymer having at least one pendant heterocyclic group, wherein said polymer has a heterocyclic group equivalent weight of from about 500 to about 100,000, and wherein said heterocyclic group is derived from a compound selected from the group consisting of

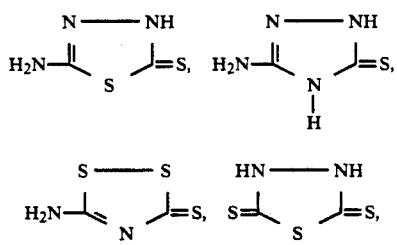

-continued
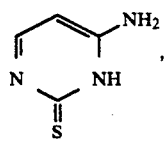
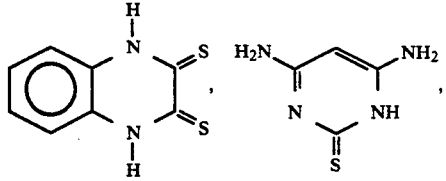
tautomers thereof, and mixtures thereof, wherein said heterocyclic group is formed by reacting said heterocyclic compound into said polymer; wherein said weight percentages are based upon the total weight of said composition.
27 Claims, No Drawings

VINYL CHLORIDE AND HETEROCYCLIC THIONE FUNCTIONAL POLYURETHANE POLYMER BLENDS AND THEIR USE IN MAGNETIC RECORDING MEDIA

FIELD OF THE INVENTION

This invention relates to polymer blends comprising vinyl chloride polymer and heterocyclic thione functional polyurethane polymer. The invention also relates to the use of such polymer blends in magnetic recording media.

BACKGROUND OF THE INVENTION

Magnetic recording media generally include a binder dispersion layer comprising a binder and a pigment overlying a substrate, wherein the pigment is dispersed within the binder. Typically, the pigment is a magnetizable pigment comprising small, magnetizable particles. In some instances, the medium may be in the form of a composite having both back-coat and front-coat binder dispersion layers, although the pigment in the back-coat may or may not be a magnetizable pigment.

It has become desirable to have as high a loading of magnetizable pigment in the magnetic recording media as is reasonably possible. It is often preferred to have a binder dispersion comprising from about 70% to 85% by weight magnetizable pigment relative to the binder with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of magnetizable pigment. To begin with, magnetizable pigments tend to agglomerate, and they are difficult to properly and fully disperse within the binder. Wetting agents, or dispersants, are often employed to facilitate such dispersion. For higher pigment loading, i.e., the use of greater amounts by weight and number of magnetizable particles, greater amounts of such dispersants are required, which is not always desirable. There are a number of reasons for using as little dispersant as possible. Dispersants tend to soften binder systems and decrease their toughness They may cure poorly. In addition, dispersants are hydrophilic and tend to increase binder water absorbance. Additionally, binder dispersions can be more readily and reproducibly prepared when no dispersant is used. Further, excess dispersant may have a tendency to bloom from a cured binder dispersion over time, leading to contamination of a recording head or the like, or causing a change in the physical or chemical characteristics of the media.

To help alleviate these problems with high pigment loading, binder compositions having internal dispersants have been developed. Such compositions comprise polymers with functional moieties pendant from the polymer backbone that help disperse the magnetizable pigment. As a result of using these compositions, less dispersant or in some instances no dispersant is needed for dispersion of magnetizable pigment in the binder.

A large amount of attention has been focused by persons skilled in the magnetic media art on polyurethanes and other polymers containing sulfonate, carboxylate, phosphate, and ammonium functionality in order to produce pigment dispersing polymers. For example, U.S. Pat. No. 4,152,485 discloses sulfonated polyurethanes. Some of the polymers described in the art can disperse iron oxide and other pigments. The dispersing groups are without exception highly polar, i.e. either salts or strongly acidic or basic.

Polymers containing highly polar dispersing groups can be disadvantageous when high humidity conditions are encountered since it has been demonstrated that the binder hydrolysis rate increases and it is speculated that coatings formed therefrom can soften and swell and friction can increase under high humidity conditions.

Copending U.S. application Ser. No. 07/635,858 (assigned to the assignee of the present case) incorporated by reference herein, discloses a heterocyclic thione functional polyurethane polymer and its use in magnetic recording media. The heterocyclic thione functional polymer is hydrophobic and thus capable of withstanding high humidity conditions without experiencing undesirable water absorption in addition to having good pigment dispersing ability, curability, and good mechanical properties (i.e., toughness, abrasion resistance, etc.).

Blends of some polyurethanes with some vinyl chloride resins are known in the magnetic binder patent art. A need exists for a blend which is capable of producing high quality pigment dispersions without need for low molecular weight dispersants. Vinyl chloride resins containing polar functionality, especially sulfonate or ammonium salt, are capable of producing good dispersions but, for most product applications, these resins lack the desired toughness and flexibility. Polyurethanes may be blended with these resins in order to improve their properties but care must be taken to preserve dispersion quality. For example sulfonated polyurethanes can produce good dispersions when blended with sulfonated vinyl resins, but are incompatible with ammonium vinyl chloride resins due to ion exchange. Carboxylated polyurethanes are compatible with ammonium vinyl chloride resins but the commercially available carboxylated polyurethanes are known to produce relatively poor dispersions by themselves and in general they degrade the dispersing capability of ammonium vinyl chloride resins upon blending. A need exists for polyurethane vinyl chloride polymer blends where the action of the polyurethane enhances and complements that of the vinyl chloride resin so that the dispersion and coatings properties of the blends are better than those of either component alone.

BRIEF DESCRIPTION OF THE INVENTION

We have found a polymer blend which demonstrates superior dispersion rheology and magnetic particle orientation quality. The blend surprisingly provides better dispersion rheology factors than dispersions made with either component polymer alone. The blends of the present invention provide a very significant advance over the known binders. The polymer blend is able to disperse a wide variety of pigments due to the synergism between the heterocyclic thione functional polymer and vinyl chloride copolymer.

One aspect of the invention relates to a novel curable composition comprising:

(a) about 5 to 95 weight percent of a vinyl chloride copolymer; and (b) about 5 to about 95 weight percent of a polymer selected from the group consisting of polyurethane and polyurethane urea, the polymer having at least one pendant heterocyclic group, wherein the polymer has a heterocyclic group equivalent weight of from about 500 to about 100,000, and wherein the heterocyclic group is derived from a compound selected from the group consisting of

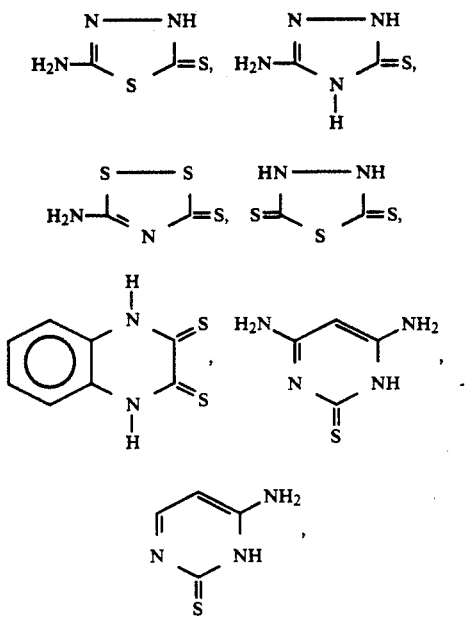

tautomers thereof, and mixtures thereof, wherein the heterocyclic group is formed by reacting the heterocyclic compound into the polymer; and wherein the weight percentages are based upon the total weight of said composition.

One or more cross-linkable hydroxy groups may optionally be pendant from the polyurethane or polyurethane urea polymer, preferably two or more for magnetic binder applications. The polyurethane or polyurethane urea preferably has a hydroxy group equivalent weight ranging from about 500 to about 10,000, most preferably from about 1000 to 5000 (g/eq.).

The polymer blend composition of the present invention is useful as a binder composition characterized by a low dispersion viscosity for use in magnetic recording media and the like that includes an internal dispersion moiety and cross-linking functionality. The polymer blend binder composition has the advantage of providing excellent dispersion of magnetic pigment in addition to providing for magnetic recording media having relatively high magnetic orientation without need for added dispersants even under conditions of relatively high pigment loading.

In another aspect, the present invention provides a dispersion for use in magnetic recording media. The dispersion comprises the polymer blend binder composition described above. A magnetizable pigment is dispersed in the composition.

In another aspect, the present invention provides a composite for magnetic recording. The composite includes a substrate having a front side and a back side. A cured dispersion comprising a binder composition comprising the above described polymer blend is coated on at least one side of the substrate. A magnetizable pigment is dispersed in the cured dispersion.

DETAILED DESCRIPTION OF THE INVENTION

The present invention comprises a blend of heterocyclic thione function polymer and vinyl chloride copolymer.

I. Methods of Preparing Heterocyclic Thione Functional Polymer

The general method of preparing the heterocyclic thione functional polymer used in the blends of the present invention is disclosed in copending U.S. application Ser. No. 07/635,858 (assigned to the assignee of the present case), incorporated by reference herein, and comprises the reaction of polyisocyanate(s) with one or more polyols, including diol(s), optional triol(s), optional tetrol(s), and heterocyclic thione compound(s). The polymer may be prepared in the presence or absence of a solvent. It is preferred to conduct the polymerization in the presence of an organic solvent such as those selected from the group consisting of methylethyl ketone, tetrahydrofuran, cyclohexanone, toluene, and mixtures thereof. Most preferred solvents include those selected from the group consisting of methylethyl ketone, tetrahydrofuran, and mixtures thereof.

A catalyst may be added to promote the reaction; for example a tin catalyst such as dibutyltin dilaurate. The component polyol(s) and polyisocyanate(s) may be reacted simultaneously or stepwise. The particular method selected may affect the dispersion quality of a dispersion prepared from the polymer blend of the invention.

There are several different methods of preparing heterocyclic thione functional polyurethane polymers useful in the invention. A "one step" method involves combining the diol(s) and any optional triol(s), tetrol(s), etc., the heterocyclic thione compound such as 5 amino-1,3,4-thiadiazole-2-thione (ATDT), and any optional catalyst together in order to form a homogeneous mixture and subsequently adding a polyisocyanate such as a diisocyanate to the mixture. The ratio of moles of isocyanate functionality to the moles of hydroxyl plus amino functionality should be less than about 1:1 so that hydroxyl functionality is obtained in the finished polymer. This ratio must additionally be adjusted if triol(s) and/or tetrol(s) are present (typically by varying the amount of isocyanate) such that gellation is avoided and such that a soluble product is obtained when a hydroxy functional polymer is desired and optional triol is present. The exact range of suitable ratios is typically in the range of about 0.5:1 to less than about 1:1. If tetrols are present and hydroxy functional polymer is desired, the ratio will typically be less than about 0.5:1. If both triols and tetrols are present the ratio used would typically fall between the ratio used when optional triol is present and the ratio used when optional tetrol is present. By following the one step method a branched polymer can be prepared by including optional triol(s) and/or tetrol(s) etc. A linear heterocyclic group functional polymer can be prepared by following the "one step" method described above but by excluding the triol(s), tetrol(s), etc.

A "two step" method includes a first step of combining the heterocyclic thione compound such as ATDT with the diol(s) and then adding an excess of diisocyanate and optionally a catalyst for step one in order to form a prepolymer. In a second step a triol is added to the prepolymer in order to form the polymer.

A "three step" method includes a first step of combining short chain and/or long chain diol(s) with an excess of a polyisocyanate in order to form an isocyanate terminated prepolymer. Preferably, there is at least about a 5 mole percent excess of isocyanate functionality in the polyisocyanate relative to hydroxy functionality in the diol(s). The second step involves the addition of a heterocyclic thione compound such as ATDT to the isocyanate terminated prepolymer such that isocyanate remains in excess and a second prepolymer is obtained. In a third step the second prepolymer is combined with a sufficient excess of a triol such that the polymer of the invention is formed. Preferably, the triol should have little polar functionality other than the hydroxy groups, and the hydroxy groups should be well spaced in the triol. The resultant polymer is soluble in the reaction solvent (not gelled) and contains excess hydroxyl functionality for future curing.

The two step and three step methods are designed to ensure that substantially all of the unreacted hydroxy groups in the polymer that are available for final cure are those hydroxy groups that are pendant from the triol. This can have favorable effects on dispersing and cure. The triol is preferably a hydrophobic segment precursor such as polycaprolactone triol so that unreacted hydroxyl groups are well isolated spatially from the relatively polar urethane groups contained in the polymer backbone.

As one example of the three step method, a diol monomer and diphenylmethane diisocyanate are combined in methyl ethyl ketone solvent in a ratio such that the number of isocyanate groups per hydroxy group is initially about 1.3. After all available hydroxy groups have been reacted, a prepolymer is obtained containing an excess of isocyanate. The prepolymer is subsequently reacted with a heterocyclic compound such as ATDT such that isocyanate remains in excess. The product is then reacted with a hydrophobic triol such that the ratio of isocyanate group to hydroxy group is within the range of about 0.3 to about 0.6. The resultant polymer product has cross-linkable hydroxy groups pendant from hydrophobic polymer chain segments comprising the triol.

I(a). Polyol

The term "polyol" as used herein refers to polyhydric alcohols containing two or more hydroxyl groups and includes diols, triols, tetrols, etc.

I(a)(i). Triols

A preferred class of triols comprises polycaprolactone triols. One particularly useful triol is a polycaprolactone triol having a hydroxy equivalent weight of about 180 and a number average molecular weight of approximately 540, available under the trademark "TONE" 0305 from Union Carbide Company. Other useful triols include polyether triols such as polypropylene oxide triol, polyester triols other than polycaprolactone triols, e.g. butylene adipate triols or polyols, and simple triols such as trimethylolpropane and glycerol. Tetrafunctional or higher alcohols such as pentaerythritol may also be useful. Preferably the hydroxy groups in the triol are primary in order to facilitate curing of the resultant polymer with a curing agent. It is also foreseen that mixtures of various triols may be utilized.

I(a) (ii). Diols

A variety of diols may be utilized in preparing the heterocyclic thione functional polymer including both short chain and long chain diols. Also, mixtures of diols can be used. A preferred class of diols are oligomeric diols defined as diols having a hydroxy equivalent weight greater than about 200 (g/eq). Most preferred are the polycaprolactone diols and polycarbonate diols having a hydroxy equivalent weight of from about 200 to 2,000 (g/eq). Such materials include polyester diols such as those sold under the trademark "TONE" 0210, available from Union Carbide Company, having a hydroxy equivalent weight of about 415. Another such material is a polycarbonate diol such as that sold under the trademark "DURACARB" 120 available from PPG industries having a number average molecular weight of about 450 (hexanediolcarbonate).

Other useful diols include: polyether diols such as polytetramethylene glycols and polypropylene glycols; and polyester diols, such as a polyester diol that is the reaction product of adipic acid and butane diol. Preferably, at least some low molecular weight (less than about 200 number average molecular weight) diols are used to provide preferred hardness characteristics to the polymer and the magnetic media prepared therefrom. Examples of these are ethylene glycol; propylene glycol; 1,3-propane diol; 1,4-butane diol; 1,5-pentane diol; 1,6-hexane diol; neopentyl glycol; diethylene glycol; dipropylene glycol; 2,2,4-trimethyl-1,3-pentane diol; cyclohexane dimethanol; 1,4-cyclohexanedimethanol; ethylene oxide and/or propylene oxide adduct of bisphenol A; ethylene oxide and/or propylene oxide adduct of hydrogenated bisphenol A. Examples of other diols which may be useful include macromonomer diols, diols having polar functional groups, and fluorinated diols such as $C_8F_{17}SO_2N[(CH_2)_2OH]_2$. Fluorinated diols can be used in an amount such that the fluorinated diol comprises about 0.1 to about 20 weight-percent of the polymer. It is further noted that for any of the reactants mentioned, mixtures of materials can be utilized.

I(b) Polyisocyanates

A wide variety of polyisocyanates may be utilized in preparing the heterocyclic thione functional polymer. Preferably, diisocyanates are utilized. Useful diisocyanates include but are not limited to those selected from the group consisting of diphenylmethane diisocyanate, isophorone diisocyanate, toluene diisocyanate, hexamethylene diisocyanate, tetramethylxylene diisocyanate, and p-phenylene diisocyanate. It is noted that mixtures of diisocyanates can also be used.

I(b). Heterocyclic Thione Groups

At least one heterocyclic thione group is pendant from the heterocyclic thione functional polymer. The term "pendant" as used herein would include a moiety bonded to an interior portion of the polymer as well as to a moiety bonded to a terminal portion of the polymer.

The heterocyclic functional groups pendant from the polymer are referred to herein as heterocyclic "thione" groups since the groups are derived from heterocyclic "thione" compounds. The heterocyclic compounds exist in tautomeric form. The thione tautomer predominates over the thiol tautomer and thus the compounds are referred to as "thiones" in the *Chemical Abstracts 9th Collective Index*, incorporated by reference herein. The term "tautomerism" refers to a well-known type of isomerism in which migration of a hydrogen atom results in two or more structures called tautomers. The tautomers are in equilibrium. The ability of the heterocyclic thiones of the invention to tautomerize is discussed in *Heterocycles II*, 121, (1978), incorporated by reference herein. The heterocyclic thione functional polymers have a heterocyclic thione group equivalent weight ranging from about 500 to about 100,000, preferably from about 5000 to about 100,000 for reasons of solvent solubility, and most preferably from about 10,000 to about 30,000 (g/eq) in order to facilitate preparation of magnetic media dispersions having optimum viscosity ranges. Useful heterocyclic thione compounds from which the pendant heterocyclic thione groups are derived include those selected from the group consisting of

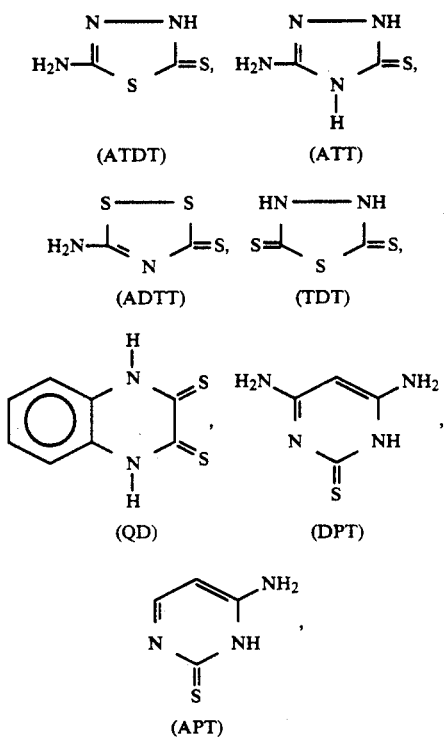

tautomers thereof, and mixtures thereof.

Preferred heterocyclic compounds from which the pendant heterocyclic groups are derived include those selected from the group consisting of

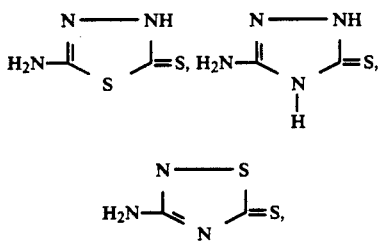

tautomers thereof, and mixtures thereof.

The heterocyclic compounds become covalently bonded to the polymer during the process of copolymerization of isocyanate(s) with polyol(s) and the heterocyclic compound(s) thus resulting in a polymer having at least one pendant heterocyclic group. The heterocyclic compounds react readily with isocyanates though a base catalyst is needed when employing a heterocyclic compound having no primary amino group. In this way the heterocyclic compounds become incorporated or reacted into polyurethane or polyurethane urea structures during the polymerization of the heterocyclic thione functional polymer from isocyanate(s), polyol(s), and heterocyclic compound(s).

Although we do not wish to be bound to any theories we believe that the thioneamide groups of the heterocyclic compound(s) must remain largely unreacted with isocyanate in order for the polymer blend to be effective in its end uses. If the heterocyclic compound selected contains a primary amino moiety (i.e. ATDT, ATT, ADTT, DPT, APT), no base catalyst is used. We presume that the primary amino group reacts with isocyanate to form a urea linkage and that the thioneamide groups of these compounds remain largely underivatized. If the heterocyclic compound selected contains no primary amino group (i.e. TDT, QD), a base catalyst is preferably added whereupon it is thought that, after one of the thioneamide groups of each heterocyclic compound reacts with isocyanate reactivity of the other group is lowered and thus the other group remains largely unreacted. In this way the thioneamide moieties become covalently bonded to the polymer backbone.

I(c). Hydroxy Groups

The heterocyclic thione functional polymer preferably possesses hydroxy functionality. It is most preferred but not required that there be on the average more than about 2 hydroxy groups per polymer chain available for crosslinking purposes. Heterocyclic thione functional polymers intended for magnetic binder use preferably have a cross-linkable hydroxy group equivalent weight of from about 500 to about 50,000, most preferably from about 1,000 to about 5,000 (g/eq). The blends of the invention should comprise about 5 to about 95 weight percent thione functional polymer, preferably about 25 to about 75 percent by weight, and most preferably about 45 to about 55 percent by weight.

II. Vinyl Chloride Copolymer

The heterocyclic thione functional polymer is compatible with a wide range of vinyl chloride copolymers. The curable binder composition of the present invention comprises from about 5 percent to about 95 percent by weight of a curable hydroxy functional vinyl chloride copolymer for good balance of properties, preferably about 25 to about 75 weight percent for superior balance of properties, and most preferably about 45 to about 55 weight percent for even better balance of properties based upon the total weight of the curable binder composition. Preferred vinyl chloride copolymers contain pendant hydroxyl groups to promote solubility, cure and compatibility with other resins. Preferred vinyl chloride copolymers also contain pendant polar groups to aid in the dispersing of pigments, and optionally, epoxy groups to improve heat stability. Other monomers may optionally be present to impart desired thermal or mechanical properties.

The vinyl chloride copolymer can be prepared by various polymerization methods, such as emulsion polymerization, solution polymerization, suspension polymerization, and bulk polymerization. In any of such polymerization methods, incremental or continuous addition of a molecular weight control agent, a polymerization initiator, and the monomers for copolymerization may be used when necessary.

Preferably the vinyl chloride monomer is present in sufficient amount such that the vinyl chloride copolymer has a vinyl chloride monomer content of at least 60% by weight for reasons of solubility and polymer blend compatibility.

In order to provide chloride copolymer having a plurality of hydroxyl groups pendant from the polymer backbone, monomers containing free hydroxyl groups are copolymerized into the vinyl chloride copolymer. These monomers should be present in a sufficient amount such that the vinyl chloride copolymer has an hydroxyl equivalent weight of about 500 to about 10,000. Examples of suitable monomers having pendant hydroxyl groups include, for example an alkanol ester of an $\alpha,\beta$-unsaturated acid such as 2-hydroxyethyl acrylate or methacrylate, hydroxypropyl acrylate or methacrylate, an olefin type alcohol such as 3-butene-1-ol, 5-hexene-1-ol, an alkanol vinyl ether such as 2-hydroxyethyl vinyl ether, an acrylamide such as N-methlolacrylamide, N-methylolmethacrylamide or the like.

Alternatively, vinyl acetate units can be copolymerized and partially or fully hydrolyzed to produce vinyl alcohol units. Such a vinyl chloride copolymer would have monomer units such as the following:

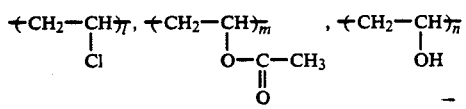

The vinyl chloride copolymer preferably contains monomer units having pendant epoxy groups in order to retard dehydrochlorination and thereby improve polymer stability. Examples of suitable monomers include a glycidyl ether of an unsaturated alcohol such as allyl glycidyl ether, a glycidyl ester such as glycidyl acrylate or methacrylate, an epoxidized olefin such as butadiene monoxide, vinylcyclohexene monoxide or the like.

The epoxy monomers may be used in an amount such that the vinyl chloride copolymer has an epoxy equivalent weight of from about 500 to about 30,000, preferably from about 1,000 to about 20,000, for reasons of maximum effectivity.

It is preferable but not essential that the vinyl chloride copolymer contain polar groups to aid in pigment wetting and dispersion. Preferred polar groups include $-SO_3M$, $-NR_3X$, $-NR_2$, $-OSO_3M$, $-COOM$, $-OPO_3M$, and $-PO_3M$ where M is a cation selected from the group consisting of alkali metal cations (e.g. $NA^+$ or $K^+$), $H^+$, or ammonium cations, R is selected from the group consisting of an alkyl comprising 1 to about 30 carbon atoms, aryl or aralkyl group and X is an anion selected from the group consisting of the halogens, sulfates or sulfonates.

The polar groups can be introduced into vinyl chloride polymers either through the use of polar initiators, polar monomers, or by polymer reactions. Whatever method is used, it is desirable that the polar groups be present in an amount sufficient to provide a vinyl chloride copolymer having a polar group equivalent weight of from about 2,000 to about 100,000 grams polymer per mole of polar group, preferably from about 5,000 to about 30,000 grams per mole of polar group for reasons of dispersion rheology.

Examples of polar initiators include but are not limited to those selected from the group consisting of 4,4'-azobis cyanovaleric acid, succinic acid peroxide, potassium persulfate, and sodium perphosphate. These materials initiate vinyl chloride polymerization and produce terminal carboxyl, sulfate or phosphate groups in the process.

Preferred monomers containing polar groups include acrylic and methacrylic esters and amides, anhydrides, and styrenic monomers. Preferred polar groups are quaternary ammonium, sulfonate, phosphate and carboxyl. Certain combinations of these polar monomers are also advantageous, for example quaternary ammonium and phosphate. Methacryloyl oxyethyl trimethyl ammonium chloride, methacryloyl oxyethyl acid phosphate, acrylamidopropyl sodium sulfonate, sodium styrene sulfonate, acrylic or methacrylic acid, maleic anhydride, and maleic acid are some particularly preferred vinyl comonomers. Examples of polar monomers include but are not limited to those selected from the group consisting of acrylic acid, methacrylic acid, vinyl sulfonic acid, styrene sulfonic acid, 2-acrylamide-2-methyl-1-propanesulfonic acid, phosphate ester of 2-hydroxyethyl methacrylate, sulfate ester of 2-hydroxyethyl methacrylate, methacryloxyethyl trimethylammonium chloride salts of the aforementioned, and dimethylaminoethyl methacrylate, and maleic anhydride.

Examples of polymer reactions to produce polar groups are: (i) reaction of succinic anhydride with hydroxyl groups on a vinyl chloride copolymer to produce pendant acid functionality and (ii) reaction of tertiary amines with epoxy groups on a vinyl chloride copolymer to produce quaternary amines.

Other types of monomers amenable to copolymerization include those selected from the group consisting of various kinds of vinyl esters such as vinyl acetate, vinylidene chloride, acrylonitrile, methacrylonitrile, styrene, acrylate and methacrylate esters such as methyl acrylate, ethyl acrylate, butyl acrylate, and butyl methacrylate and other unsaturated monomers such as vinyl ethers, acrylamide, methacrylamide, maleic anhydride, and mixtures thereof.

Some preferred vinyl chloride copolymer resins are described in U.S. Pat. No. 4,816,683, incorporated by reference herein (assigned to Sekisui Chemical). These are copolymers of vinyl chloride, hydroxypropyl acrylate, methacryloyl oxyethyl trimethylammonium chloride, and methyacryloyl oxyethyl phosphate. These are thought to be similar to or the same as the commercially available "S-LEC E-C" resins (E-C130 and E-C110) made by Sekisui Chemical Co. According to information supplied by the vendor, these are approximately 84% vinyl chloride, 16% hydroxy acrylic monomer (by weight) and contain a fraction of a percent of other monomers, including a quaternary ammonium monomer.

Another preferred class of vinyl chloride copolymers are the sulfonated vinyl "MR" resins (MR-110, MR-113, MR-120, and others) commercially available from Nippon Zeon Co. Polymers of this type are described in U.S. Pat. Nos. 4,707,410 and 4,707,411 (assigned to Nippon Zeon), both incorporated by reference herein. A preferred resin approximate composition: 20,000 sulfonate equivalent weight, 2000 hydroxyl equivalent weight and 5500 epoxy equivalent weight.

Another useful vinyl chloride copolymer is UCAR-MAG binder 528 from Union Carbide which contains carboxyl group (about 5600 g/mole) and hydroxyl groups (850 g/mole) described in U.S. Pat. No. 4,985,314, incorporated by reference herein.

Vinyl chloride copolymers containing no polar functionality can also be useful in some cases. An example is VAGH from Union Carbide which contains vinyl chloride and hydrolyzed vinyl acetate such that the hydroxyl equivalent weight is about 750 g/mole.

III. Dispersions of Polymer Blends of the Invention for Use in Magnetic Media The polymer blends described herein can be used to prepare magnetic media such as tapes, e.g., video tapes, computer tape and data cartridge tape, and diskettes, both single-sided and double-sided. The polymer blends are typically prepared by combining solvent solutions of the respective polymers in the desired proportions.

A magnetic or magnetizable pigment can be readily dispersed within the polymeric binder blends of the invention, dispersion being facilitated by the incorporated heterocyclic moiety. The preparation of dispersions of magnetic pigments within the polymer blends of the present invention, is relatively straight-forward. A variety of pigments may be used, including but not limited to: ferric oxides; gamma ferric oxide; cobalt doped gamma ferric oxides; chromium oxide; iron; iron-cobalt; cobalt; nickel; cobalt-nickel; cobalt-phosphorus; barium ferrite; and mixtures thereof.

It is foreseen that a variety of loadings, densities, solvent systems, adjuvants, etc., may be utilized. The following conditions are typical, and were employed in preparation of some of the dispersions reported in the examples below (parts by weight unless otherwise noted): about 100 parts of fine pigment such as (Co-$\gamma$-Fe$_2$O$_3$) having a surface area 50 m$^2$/g and a powder coercivity of 950 Oersted; about 15 to 40 parts of binder (i.e., polymer blend); and about 150 to 400 parts of solvent are combined with about 750 parts of steel or glass milling media in a steel container and milled by agitation until the pigment is dispersed throughout.

The dispersion of the present invention can be readily cured. One method of cure involves use of multi-functional isocyanate curing agents, the isocyanate groups of which may react with hydroxy groups which may be present on the polymer of the present invention. The primary mode of cure is believed to be a moisture cure reaction between available isocyanate groups and H$_2$O molecules present in the environment. Hydroxy groups present in the heterocyclic thione functional polymer can react with isocyanate groups and thus facilitate cure. A curative is typically added after a dispersion comprising pigment, solvent, and the polymer blend binder is prepared. A typical curative comprises, for example, a triisocyanate such as the adduct of toluene diisocyanate with trimethylol propane. One such material is available under the trade designation Mondur ™ CB-601 from Mobay Chemical Company. Other typical curatives are polyisocyanate compounds, for example polyisocyanates such as those sold under the trademarks "MONDUR" CB-601, "MONDUR" CB-75, "MONDUR" MRS (all available from Mobay Chemical Co.), Desmodur L (available from Bayer A.G.), and Coronate L (available from Nippon Polyurethane). Additional isocyanate curing agents are described in U.S. Pat. No. 4,731,292, incorporated by reference herein. The curative is preferably added in a proportion of about 1 to about 20 weight percent based upon the binder weight (i.e. polymer blend weight).

The resulting dispersion can be readily applied to a support such as a polyethylene terephthalate (PET) film using a knife coating method. The support on which the magnetic coating material is applied may be made of the following materials; polyesters such as polyethylene terephtalate and polyethylene-2,6-naphthalate; polyolefins such as polyethylene and polypropylene; derivatives of cellulose such as cellulose triacetate, cellulose acetate butylate, cellulose acetate propionate; polycarbonate; polyvinyl chloride; polyimides; polyamides; metals such as aluminum and copper; and paper. Immediately after coating and while the solvent is still present and the binder is substantially uncured, the coated substrate typically undergoes orientation in a magnetic field to align the magnetic particles. After coating and orienting, the substrate is dried of solvent and allowed to cure. The curing retains the pigment in the oriented manner. Curing can take place either at room temperature or at elevated temperatures (50°-60° C.).

A variety of additives known to those skilled in the art can be incorporated into the dispersion of the present invention. The dispersion can further comprise head-cleaning agents, lubricants, dispersants, and wetting agents. It is envisioned that lubricants such as those disclosed in U.S. Pat. Nos. 4,731,292 and 4,784,907, both incorporated by reference herein, could be added to obtain desired frictional and processing characteristics. Examples of useful lubricants include but are not limited to $C_{10}$ to $C_{22}$ fatty acids, $C_1$ to $C_{18}$ alkyl esters of fatty acids, and mixtures thereof. Other examples of useful lubricants include silicone compounds such as silicone oils, fluorochemical lubricants, fluorosilicones, and particulate lubricants such as powders of inorganic or plastic materials. Preferred lubricants include myristic acid, stearic acid, palmitic acid, and butyl and amyl esters thereof. Typically mixtures of lubricants are used, especially mixtures of fatty acids and fatty esters.

If the binder described herein is used as a back-coat for magnetic media, the back-coat can optionally further comprise non-magnetizable pigments, such as, for example, carbon black, graphite, aluminum oxide, titanium dioxide, zinc oxide, silica gel, calcium carbonate, barium sulfate, and mixtures thereof.

The dispersion may further comprise an effective amount of a suitable dispersing agent, preferably about 1 to about 10 weight percent based upon pigment weight in order to disperse the pigment. Suitable dispersants include lethicin and quaternary ammonium acetates or phosphates such as those sold under the trademark "EMCOL" acetate, a polypropylene oxide adduct of dimethyl ethanolamine quarternized with ethylene oxide and acetic anhydride, having a number average molecular weight of about 2300, and EMCOL ™ phosphate, a polypropylene adduct of dimethyl ethanolamine quarternized with ethylene oxide and phosphoric acid. Both are available from Witco Chemical Co. and are disclosed in U.S. Pat. No. 4,837,082 incorporated by reference herein.

The dispersion may further comprise about 1 to about 10 weight percent of a wetting agent based upon the weight of the pigment. Suitable wetting agents include but are not limited to phosphoric acid esters such as mono-phosphorylated propylene oxide adducts of glycerin, e.g., the reaction product of 1 mole of phosphorous oxychloride with the reaction product of 10-11 moles of propylene oxide and 1 mole of glycerine.

Examples of useful head cleaning agents include but are not limited to those disclosed in U.S. Pat. Nos.

4,784,914 and 4,731,292 both incorporated by reference herein. Examples of such head cleaning agents include but are not limited to alumina, chromium dioxide, alpha iron oxide, and titanium dioxide particles of a size less than about 2 microns which have a Mohs hardness of greater than about 5 and which are added in an amount ranging from about 0.2 to about 20 parts per hundred parts of magnetic pigment.

The detailed description includes exemplary preparations of the polymer blends in accordance with the invention and dispersions prepared therefrom. All parts and percentages throughout the Specification, including the Examples, are by weight unless otherwise indicated.

In the following examples, the following trade names and abbreviations are used:

"TONE" 0210— a trademark for a a polycaprolactone diol produced by Union Carbide, number average molecular weight about 825, hydroxy equivalent weight about 415.

"DURACARB 120" — a trademark for an aliphatic polycarbonate diol, number average molecular weight about 900, from PPG Industries, Inc.

Neopentyl glycol — a low molecular weight diol, number average molecular weight 104, hydroxy equivalent weight 52, additive for providing preferred characteristics.

"TONE 0305 — a trademark for a polycaprolactone triol available from Union Carbide, number average molecular weight about 540, hydroxy equivalent weight about 180.

Diphenylmethane diisocyanate (MDI) — an isocyanate, number average molecular weight 250, isocyanate equivalent weight 125.

"MONDUR" CB-601 a trademark for a triisocyanate available from Mobay Chemical Company. CB-601 is a toluene diisocyanate-based adduct of unspecified triols and diols which contains 10.4 percent NCO and is supplied as a 60 percent solution in ethylene glycol diacetate.

MEK — methyl ethyl ketone
ATDT — 5 amino-1,3,4-thiadiazole-2-thione
ADTT — 5-amino-1,2,4-dithiazole-3-thione
ATT — 5-amino-1,2-dihydro-1,2,4-triazole-3-thione
APT — 4-amino-2-pyrimidinethione
DPT — 4,6-diamino-2-pyrimidinethione
TDT — 1,3,4-thiadiazolidine-2,5-dithione
QD — 1,4-dihydro-2,3-quinoxalinedithione Dowa HM-19 is a 47 m²/g iron particle available from DOWA Mining Co., Ltd., Tokyo, Japan.

Showa head cleaning agent is an alumina particle material available from Showa Denka Ltd., Tokyo, Japan.

Ti7503=Carboxyl-functional polyurethane from Sanyo Chemical Co., Ltd.

SHPU=Sulfonated hydroxy functional polyurethane

E-C130 (Sekisui Co.) — (quarternary ammonium vinyl chloride) 84% vinyl chloride, 16% hydroxy acrylic monomer, and 0.4% other monomers.

MR-120 (Nippon Zeon Co.) — (sulfonated hydroxy epoxy - functional vinyl chloride copolymer) approximately 84% vinyl chloride, 7% hydroxypropyl acrylate or methacrylate, and 2.5% epoxy.

VAGH — (Union Carbide) — (hydroxy-functional vinyl chloride copolymer - hydroxyl equivalent weight: 740 grams/gram mole) vinyl chloride vinyl acetate copolymer approximately 90% vinyl chloride, 4% vinyl acetate, 6% vinyl alcohol.

DEFINITION OF TERMS

Equivalent Weight

The term "equivalent weight" or "Eq. Wt.", as used herein with respect to a functionality or moiety, refers to the mass of polymer per mole, or equivalent, of functionality.

Squareness Ratio

The squareness ratio (Br/Bm), which is the ratio of the remnant saturation induction, or residual magnetization (Br), to the saturation induction, or saturation magnetization (Bm), refers to the effectiveness of the orientation of the magnetic particles in a dispersion. For randomly-oriented particles, the squareness ratio is 0.5 and for ideally and perfectly oriented particles, the ratio is equal to 1.0, thus the higher the value the better.

Inherent Viscosity

The inherent viscosity of each composition was measured to provide a comparison of the molecular weight of each composition. The inherent viscosity was measured by conventional means using a Wescan #50 viscometer in a water bath controlled at 25° C. to measure the flow time of 10 milliliters of a polymer solution (0.8 grams per deciliter of polymer in tetrahydrofuran solvent) and the flow time of the solvent. In each experiment, inherent viscosity is reported in deciliters per gram.

ICI Viscosity

The ICI viscosity of various magnetic media binder dispersions of the invention were measured on an ICI Rotating Cone and fixed plate viscometer from Research Equipment, Ltd. (London) which provided a measurement of viscosity in centipoise.

Gloss

"Gloss" refers to the percentage of light incoming at 45° that is reflected at an observation angle of 45° measured via a Pacific Scientific Glossgard II 45° glossmeter.

EXAMPLES

All parts, percentages, and ratios used in the examples and the rest of the specification are by weight unless otherwise indicated.

COMPARATIVE EXAMPLE A

SHPU

Sulfonated hydroxy functional polyurethane prepared according to U.S. application Ser. No. 07/751,334 incorporated by reference herein was prepared as follows.

Preparation of Preferred Sulfonate Monomer (B)

67.77 kilograms of "TONE ™" 0210 diol (164 equivalents), 8.16 kilograms of toluene, and 5.72 kilograms of DMSSIP (39 equivalents) were combined and then heated to 80° C. with distillation of toluene. The remainder of the toluene was removed under vacuum at 110° C. The vacuum was released under nitrogen and 40 grams of tetrabutyltitanate was added. The system was then heated to 200° C. under nitrogen and held for 3 hours while collecting methanol distillate. After cooling to 120° C., a vacuum was pulled on the reaction mixture and these conditions were held for 4 hours. The product was filtered and cooled. The hydroxy equivalent weight by analysis was determined to be 603 grams/equivalent. The sulfonate equivalent weight was calculated to be 3745 grams/equivalent.

Preparation of Sulfonated Polyurethane Binder 74.84 kilograms of methyl ethyl ketone, 18.14 kilograms of cyclohexanone, 3.97 kilograms of neopentyl glycol (76.2 equivalents), and 15.88 kilograms of sulfonate diol monomer B (29.1 equivalents) were combined, and 9.1 kilograms of diphenylmethane diisocyanate (137.2 equivalents) and 23 grams of dibutyltin dilaurate were added. The reaction was held at 35° C. for 3 hours whereupon this prepolymer solution was drained to a clean dry holding container. It showed an isocyanate equivalent weight of 1450 grams/equivalent.

22.68 kilograms of methyl ethyl ketone and 12.02 kilograms of "TONE TM " 0305 triol (66.8 equivalents) were combined in the reaction vessel whereupon the prepolymer solution was added to this reaction mixture with stirring. After the isocyanate had reacted, a further addition of 1.2 kilograms of diphenylmethane diisocyanate gave a final inherent viscosity in tetrahydrofuran of 0.30. The product had a hydroxy equivalent weight measured to be 1700 grams/equivalent and the sulfonate equivalent weight was calculated to be 12,000 grams/equivalent.

Examples 1-5 describe the preparation of heterocyclic thione functional polymers useful in the polymer blends of the invention.

EXAMPLE 1

20,000 Eq. Wt. ATDT Polyurethane

To a 5 liter flask were added 464 g (1.093 eq) "TONE TM " 0210 polycaprolactone diol, 97.2 g (1.87 eq) neopentyl glycol, 1646 g MEK, and 0.2 g dibutyltindilaurate. The mixture was heated to distill off 50 g of MEK and then cooled to 50° C. 492 g (3.94 eq) diphenylmethane diisocyanate (MDI) were added and the reaction was heated at reflux for 1 hour. 9.4 g (0.071 eq) 5-amino-1,3,4-thiadiazole-2-thione (ATDT) was then added and the reaction was held at reflux for another hour. 327 g (1.82 eq) "TONE TM " 0305 polycaprolactone triol and 491 g MEK were added and the mixture was heated for 3 hours at reflux. One additional charge of diphenylmethane diisocyanate (10.7 g, 0.086 eq) was added and reacted for 1 hour to reach a final inherent viscosity of 0.29. The calculated hydroxyl equivalent weight was 1950 g/eq and the calculated ATDT content was 20,000 g/eq.

EXAMPLE 2

20,000 Eq. Wt. ATDT Polycarbonate Polyurethane

The procedure of Example 1 was followed except for the use of 464 g "DURACARB TM " 120 diol, 97 g neopentyl glycol, 500 g MDI, 9.3 g ATDT, 323 g Tone TM 305 triol, and 2097 g MEK. Final inherent viscosity=0.29. Calculated hydroxyl equivalent weight=1850 g/eq. Calculated ATDT equivalent weight=20,000.

EXAMPLE 3

10,000 Eq. Wt. ATDT Polyurethane

The procedure of Example 1 was followed except for the use of 60.2 g "TONE TM " 0210 diol, 12.6 g neopentyl glycol, 65.4 g MDI, 2.5 g ATDT, 43.5 g Tone TM 0305, 348 g MEK, 0.0 g additional MDI. Final inherent viscosity=0.246. Calculated hydroxyl equivalent weight=1937 g/eq. Calculated ATDT equivalent weight=10,000 g/eq.

EXAMPLE 4

30,000 Eq. Wt. ATDT Polyurethane

The procedure of Example 1 was followed except for the use of 60.3 g Tone TM 0210, 12.6 g neopentyl glycol, 63.4 g MDI, 0.8 g ATDT, 42.1 g "TONE TM " 0305 triol, 338 g MEK, 1.3 g additional MDI. Final inherent viscosity=0.295. Calculated hydroxyl equivalent weight=1945 g/eq. Calculated ATDT equivalent weight=30,000 g/eq.

EXAMPLE 5

5,000 Eq. Wt. ATDT Polyurethane

The procedure of Example 1 was followed except for the use of 60.2 g "TONE TM " 0210 diol, 12.6 g neopentyl glycol, 71 g MDI, 5.2 g ATDT, 45.7 g "TONE TM " 0305 triol, 363 g MEK. Final inherent viscosity=0.22. Calculated hydroxyl equivalent weight=1900 g/eq. Calculated ATDT equivalent weight=5000 g/eq.

EXAMPLE 6

60,000 Eq. Wt. ATDT Polyurethane

The procedure of Example 1 was followed except for the use of 60.2 g "TONE TM " 0210 diol, 12.6 g neopentyl glycol, 65.8 g MDI, 0.4 g ATDT, 41.8 g "TONE TM " 0305 triol, 270 g MEK. Final inherent viscosity=0.275. Calculated hydroxyl equivalent weight=1850 g/eq. Calculated ATDT equivalent weight=60,000 g/eq.

EXAMPLE 7

10,000 Eq. Wt. TDT Polyurethane

The procedure of Example 1 was followed except for the use of 64.8 g "TONE TM " 0210 diol, 12.6 g neopentyl glycol, 70.7 g MDI, 3.0 g TDT in place of ATDT, 47.0 g "TONE TM " 0305 triol 377 g MEK. Final inherent viscosity=0.29. Calculated hydroxyl equivalent weight=1800 g/eq. Calculated TDT equivalent weight=10,000 g/eq.

EXAMPLE 8

10,000 Eq. Wt. QD Polyurethane

The procedure of Example 1 was followed except for the use of 64.8 g "TONE TM " 0210 diol, 12.6 g neopentyl glycol, 70.7 g MDI, 3.3 g QD in place of ATDT, 47.0 g "TONE TM " 0305 triol, 378 g MEK. Final inherent viscosity=0.33. Calculated hydroxyl equivalent weight=1800 g/eq. Calculated QD equivalent weight=10,000 g/eq.

EXAMPLE 9

20,000 Eq. Wt. DPT Polyurethane

The procedure of Example 1 was followed except for the use of 60.2 g "TONE TM " 0210 diol, 12.6 g neopentyl glycol, 65.4 g MDI, 1.4 g DPT in place of ATDT, 43.5 g "TONE TM " 0305 triol, 278 g MEK. Final inherent viscosity=0.30. Calculated hydroxyl equivalent weight=1800 g/eq. Calculated DPT equivalent weight=20,000 g/eq.

EXAMPLE 10

20,000 Eq. Wt. APT Polyurethane

The procedure of Example 1 was followed except for the use of 60.2 g "TONE TM " 0210 diol, 12.6 g neopentyl glycol, 63.9 g MDI, 1.2 g APT in place of ATDT, 42.5 g "TONE TM " 0305 triol, 274 g MEK. Final inherent viscosity=0.25. Calculated hydroxyl equivalent weight=1800 g/eq. Calculated APT equivalent weight=20,000 g/eq.

EXAMPLE 11

10,000 Eq. Wt. ATT Polyurethane

The procedure of Example 1 was followed except for the use of 60.2 g "TONE TM " 0210 diol, 12.6 g neopentyl glycol, 65.4 g MDI, 2.2 g ATT in place of ATDT, 43.5 g "TONE TM " 0305 triol, 347 g MEK. Final inherent viscosity=0.28. Calculated hydroxyl equivalent weight=1800 g/eq. Calculated ATT equivalent weight=10,000 g/eq.

EXAMPLE 12

20,000 Eq. Wt. ADTT Polyurethane

The procedure of Example 1 was followed except for the use of 55.0 g "TONE TM " 0210 diol, 11.5 g neopentyl glycol, 58.4 g MDI, 1.2 g ADTT, 38.8 g "TONE TM " 0305 triol, 280 g MEK. Final inherent viscosity=0.26 Calculated hydroxyl equivalent weight=1500 g/eq. Calculated ATDT equivalent weight=20,000 g/eq.

EXAMPLE 13

One Step ATDT Polyurethane

To a 1 liter flask were added 55 g (0.129 eq) "DURA-CARB TM " 120 polycarbonate diol, 11.5 g (0.222 eq) Neopentyl glycol, 1.1 g (0.008 eq) ATDT, 38.7 g (0.215 eq) "TONE TM " 0305 triol polycaprolactone triol, 0.1 g dibutyltindilaurate, and 297 g MEK. The mixture was stirred and 58.3 g (0.466 eq) diphpenylmethane diisocyanate was added and the reaction was heated at reflux for 3 hours. The final inherent viscosity was 0.22. Calculated hydroxyl equivalent weight=1850 g/eq. Calculated ATDT equivalent weight=20,000 g/eq.

EXAMPLE 14

Two Step ATDT Polyurethane

To a 1 liter flask Were added 55 g (0.129 eq) "DURA-CARB TM " 120 polycarbonate diol, 11.5 g (0.222 eq) neopentyl glycol, 190 g methylethyl ketone, 0.1 g dibutyltindilaurate and 1.1 g (0.008 eq) ATDT. The mixture was stirred and 58.3 g (0.466 eq) diphenylmethane diisocyanate was added and the reaction was heated at reflux for 2 hours. 38.7 g (0.215 eq) "TONE TM " 0305 triol polycaprolactone triol, and 58 g methylethylketone were added and the reaction was held at reflux for 4 hours. The final inherent viscosity was 0.26. The calculated hydroxyl equivalent weight was 1850 g/eq and the calculated ATDT content was 20,000 g/eq.

EXAMPLE 15

Linear ATDT Polyurethane

TO 1 liter flask were added 60 g (0.129 eq) "TONE TM " 0210 diol polycaprolactone diol, 12.6 g (0.242 eq) neopentyl glycol (Union Carbide), 306 g MEK and 0.1 g dibutyltindilaurate. The mixture was heated to distill off 50 g of MEK. 58.3 g (0.466 eq) diphenylmethane diisocyanate was added and the reaction was heated at reflux for 1 hour. 1.3 g (0.009 eq) ATDT was then added and the reaction was held at reflux for 1 hour. 50.7 g (0.119 eq) "TONE TM " 0210 diol polycaprolactone diol and 94 g MEK were added and the reaction was held at reflux for 2.5 hours. The final inherent viscosity was 0.37. The calculated ATDT content was 20,000 g/eq.

EXAMPLE 16

Preparation of Iron Oxide Dispersions

The purpose of Example 16 was to demonstrate the application of the polymer blends of the invention as binders in magnetic recording media. Separate binder dispersion compositions were prepared. The following ingredients were separately introduced into a 0.5 liter stainless steel milling container and mixed and dispersed therein, for 5 hours at 1500 RPMs in order to form a dispersion: 81 g of iron oxide pigment ISk 9966 (available from Ishihara Sangyo Kaisha, Ltd., Tokyo), 192 g of methyl ethyl ketone, 600 g of steel media (1.3 mm diameter), a total of 27 g of urethane polymer/vinyl chloride copolymer blend. Comparative Examples were prepared by substituting various urethane polymers.

The resulting dispersions were applied to films of a polyethylene terephthalate (thickness: 25 micrometers) by means of knife coating and the resulting coated films were allowed to stand in a parallel magnetic field of 1400 Oersted for about one second. The magnetic layers obtained had thicknesses of about 5 micrometers. The dispersions for preparing the tapes of the foregoing examples were evaluated for viscosity. The squareness ratio and gloss of the magnetic coatings of the tapes prepared in the foregoing examples were also measured. Gloss, dispersion viscosity, and squareness data is shown in Tables B and C.

The data contained in Table B demonstrates that the ATDT containing polymer blends provides a dispersing effect over a range of equivalent weights and with a range of vinyl chloride copolymers. Table C demonstrates that there is an unexpected synergism between the ATDT-HPU and the vinyl chloride resins — the best results were obtained with the 50/50 blend. This is not true of the sulfonated or the carboxylated polyurethanes used as comparative examples.

EXAMPLE 17

Preparation of Metal Particle Dispersions 20,000 ATDT polymer prepared according to Example 2 was formulated into metal particle dispersions as follows: metal particle Dowa HM-19 (150 g); Showa head cleaning agent (12 g); polymer blend of the invention solids weight (31 g); MEK (244 g); cyclohexanone (54 g); toluene (60 g); and ceramic milling media (485 g). This mixture was milled at 1500 rpm in a 0.51 sand mill for 8 hours and then coated and aligned as in Example 14. Results are shown in Table A.

The data contained in Table A demonstrates that blends of ATDT-HPU with either MR-120 or E-C130 can be very effective metal particle dispersants. The dispersions are low in viscosity and the coatings are high in gloss and squareness for this type of experiment.

While this invention has been described in connection with specific embodiments, it should be understood that it is capable of further modification. The claims herein are intended to cover those variations which one skilled in the art would recognize as the chemical equivalent of what has been described here.

TABLE A

| | Metal Particle Data | | |
|---|---|---|---|
| Polymer in Dispersion | ICI Viscosity | Gloss | Squareness Ratio |
| Ex. 2 20,000 ATDT/EC-130 50/50 | 31 | 52 | 0.730 |
| Ex. 2 20,000 ATDT/MR-120 50/50 | 37 | 49 | 0.700 |

TABLE B

| Urethane Polymer/Vinyl Chloride Copolymer | ATDT Equivalent Weight | Polymer Weight Ratio | ICI Viscosity Initial | ICI Viscosity 4 days | Squareness Ratio | Gloss |
|---|---|---|---|---|---|---|
| Ex. 1 ATDT-HPU/EC-130 | 20,000 | 50/50 | 44 | 93 | 0.780 | 58 |
| Ex. 3 ATDT-HPU/MR-120 | 10,000 | 50/50 | 69 | 95 | 0.726 | 64 |
| Ex. 1 ATDT-HPU/MR-120 | 20,000 | 50/50 | 49 | 95 | 0.716 | 52 |
| Ex. 4 ATDT-HPU/MR-120 | 30,000 | 50/50 | 127 | 155 | 0.764 | 70 |
| Ex. 1 ATDT HPU/VAGH | 20,000 | 50/50 | 49 | 60 | 0.716 | 40 |
| Comp. Ex. SHPU/MR120 | — | 50/50 | 55 | 65 | 0.753 | 63 |

TABLE C

| | DISPERSIONS AND COATINGS DATA | | |
|---|---|---|---|
| Urethane Polymer/ Vinyl Chloride Copolymer | Urethane Polymer/ Vinyl Chloride Copolymer Ratio | ICI Viscosity | Squareness Ratio |
| EX. 2 ATDT-HPU/E-C130 | 0/100 | 96 | 0.762 |
| EX. 2 ATDT-HPU/E-C130 | 33/67 | 90 | 0.801 |
| EX. 2 ATDT-HPU/E-C130 | 50/50 | 40 | 0.862 |
| EX. 2 ATDT-HPU/E-C130 | 67/33 | 35 | 0.798 |
| EX. 2 ATDT-HPU/E-C130 | 100/100 | 33 | 0.740 |
| EX. 2 ATDT-HPU/MR-120 | 33/67 | 95 | 0.682 |
| EX. 2 ATDT-HPU/MR-120 | 50/50 | 55 | 0.801 |
| EX. 2 ATDT-HPU/MR-120 | 67/33 | 70 | 0.703 |
| COMP. EX. A SHPU/MR-120 | 33/67 | 65 | 0.759 |
| COMP. EX. A SHPU/MR-120 | 50/50 | 50 | 0.750 |
| COMP. EX. A SHPU/MR-120 | 67/33 | 55 | 0.792 |
| COMP. EX. A SHPU/MR-120 | 100/0 | 25 | 0.800 |
| COMP. EX. A SHPU/E-C130 | 33/67 | 105 | 0.772 |
| COMP. EX. A SHPU/E-C130 | 50/50 | 65 | 0.678 |
| COMP. EX. A SHPU/E-C130 | 67/33 | 40 | 0.750 |
| TI-7503/MR-120 | 33/67 | 65 | 0.696 |
| TI-7503/MR-120 | 50/50 | 95 | 0.615 |
| TI-7503/MR-120 | 67/33 | 145 | 0.596 |
| TI-7503/E-C130 | 33/67 | 65 | 0.763 |
| TI-7503/E-C130 | 50/50 | 155 | 0.697 |
| TI-7503/E-C130 | 67/33 | 155 | 0.612 |

What is claimed is:

1. A composition comprising:
   (a) about 5 to 95 weight percent of a vinyl chloride copolymer; and
   (b) about 5 to about 95 weight percent of a polymer selected from the group consisting of polyurethane and polyurethane urea, said polymer having at least one pendant heterocyclic group, wherein said polymer has a heterocyclic group equivalent weight of from about 500 to about 100,000, and wherein said heterocyclic group is derived from a compound selected from the group consisting of

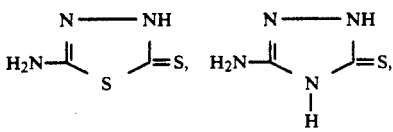

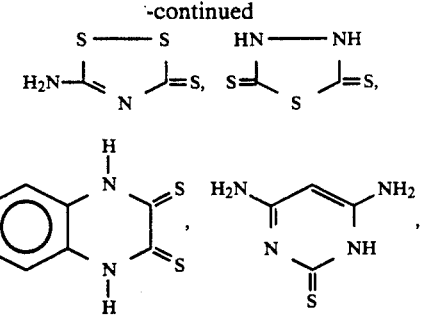

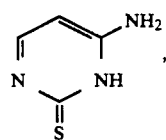

tautomers thereof, and mixtures thereof, wherein said heterocyclic group is formed by reacting said heterocyclic compound into said polymer; wherein said weight percentages are based upon the total weight of said composition.

2. The composition of claim 1 wherein the polymer of element (b) has at least one crosslinkable hydroxy group pendant from the polymer, wherein the polymer has a hydroxy equivalent weight of from about 500 to about 50,000.

3. The polymer of claim 1 wherein said heterocyclic group is derived from a compound selected from the group consisting of

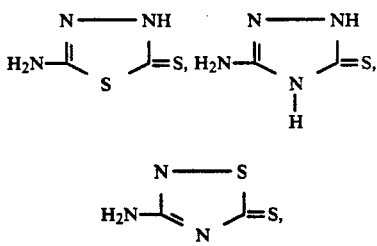

tautomers thereof, and mixtures thereof.

4. The composition of claim 1 wherein said polymer of element (b) has more than 2 hydroxy groups pendant from the polymer.

5. The composition of claim 1 wherein said polymer of element (a) has incorporated therein a polar group —$NR_3X$ wherein R is selected from the group consisting of alkyl groups comprising about 1 to about 20 carbon atoms, aryl groups comprising about 1 to about 20 carbon atoms, and aralkyl groups comprising about 1 to about 20 carbon atoms, and wherein X is an anion selected from the group consisting of halogens, sulfates, and sulfonates.

6. The composition of claim 1 wherein said polymer of element (a) has incorporated therein a polar group selected from the group consisting of —$SO_3M$ and —$OSO_3M$ wherein M is a cation selected from the group consisting of alkali metal cations, $H_+$ and ammonium cations.

7. The composition of claim 1 wherein the heterocyclic group equivalent weight of the polymer of element (b) ranges from about 5000 to about 100,000.

8. The composition of claim 2 wherein the heterocyclic group equivalent weight of the polymer of element (b) ranges from about 10,000 to about 30,000; and the hydroxy equivalent weight of the polymer of element (b) from about 1,000 to about 5,000.

9. The composition of claim 1 wherein said vinyl chloride copolymer has incorporated therein at least one pendant polar group selected from the group consisting of —$SO_3M$, —$NR_3X$, —$NR_2$, —$OSO_3M$, —$COOM$, —$OPO_3M$, and —$PO_3M$, wherein M is a cation selected from the group consisting of alkali metal cations, $H^+$ and ammonium cations, wherein R is selected from the group consisting of alkyl groups comprising about 1 to about 20 carbon atoms, aryl groups comprising about 1 to about 20 carbon atoms, and aralkyl groups comprising about 1 to about 20 carbon atoms, and wherein X is an anion selected from the group consisting of halogens, sulfates, and sulfonates.

10. The composition of claim 9 wherein M is selected from the group consisting of $Li^+$, $Na^+$, $K^+$, $H^+$, $NP_4^{+2}$ and mixtures thereof.

11. The curable composition of claim 1 wherein said vinyl chloride copolymer has incorporated therein epoxy group(s), said vinyl chloride copolymer having an epoxy equivalent weight of from about 500 to about 30,000, a hydroxy equivalent weight of about 500 to about 5000, and a sulfonate equivalent weight of from about 5000 to about 100,000.

12. The composition of claim 1 wherein said vinyl chloride copolymer has incorporated into its structure monomer selected from the group consisting of vinyl acetate, vinyl alcohol, hydroxypropyl acrylate, hydroxypropyl methacrylate, hydroxyethyl acrylate, and hydroxyethyl methacrylate.

13. A dispersion for use in magnetic recording media comprising:
(a) the composition of claim 1; and
(b) a magnetizable pigment dispersed in said composition.

14. The dispersion of claim 13 which further comprises an additive selected from the group consisting of nonmagnetizable pigments, lubricants, dispersants, wetting agents, and curatives.

15. The dispersion of claim 13 wherein said pigment is selected from the group consisting of ferric oxides, gamma ferric oxide, cobalt doped gamma ferric oxides, chromium oxide, iron-cobalt, cobalt, nickel, cobalt-nickel, cobalt phosphorous, barium ferrite, and mixtures thereof.

16. The dispersion of claim 13 wherein said dispersion further comprises nonmagnetizable pigment selected from the group consisting of carbon black, graphite, aluminum oxide, titanium dioxide, zinc oxide, silica gel, calcium carbonate, barium sulfate, and mixtures thereof.

17. A dispersion for use in magnetic recording media comprising:
(a) the composition of claim 2; and
(b) a magnetizable pigment dispersed in said composition.

18. The dispersion of claim 17 which further comprises an additive selected from the group consisting of nonmagnetizable pigments, lubricants, dispersants, wetting agents, and curatives.

19. The dispersion of claim 17 wherein said pigment is selected from the group consisting of ferric oxides, gamma ferric oxide, cobalt doped gamma ferric oxides, chromium oxide, iron, iron-cobalt, cobalt, nickel, cobalt-nickel, cobalt phosphorous, barium ferrite, and mixtures thereof.

20. The dispersion of claim 17 wherein said dispersion further comprises nonmagnetizable pigment selected from the group consisting of carbon black, graphite, aluminum oxide, titanium dioxide, zinc oxide, silica gel, calcium carbonate, barium sulfate, and mixtures thereof.

21. A composite for magnetic recording comprising:
(a) a substrate having a front side and a back side;
(b) a dispersion coating on at least one side comprising the composition of claim 1; and
(c) a magnetizable pigment and optionally a nonmagnetizable pigment dispersed in said dispersion on at least one side.

22. A composite for magnetic recording comprising:
(a) a substrate having a front side and a back side;
(b) a dispersion coating on at least one side comprising the composition of claim 2; and
(c) a magnetizable pigment and optionally a nonmagnetizable pigment dispersed in said dispersion on at least one side.

23. A magnetic recording medium having a magnetizable layer of fine particles which are dispersed in a binder wherein said binder comprises the composition of claim 1.

24. A magnetic recording medium having a magnetizable layer of fine particles which are dispersed in a binder wherein said binder comprises the cured composition of claim 2.

25. The composite of claim 21 which further comprises an additive selected from the group consisting of non-magnetizable pigments, lubricants selected from the group consisting of fatty acids, fatty acid esters, and fluorochemical lubricants, dispersants, wetting agents, and curatives.

26. The composite of claim 22 which further comprises an additive selected from the group consisting of non-magnetizable pigments, lubricants selected from the group consisting of fatty acids, fatty acid esters, and fluorochemical lubricants, dispersants, wetting agents, and curatives.

27. A magnetic recording media having a back-coat comprising the cured composition of claim 1.

* * * * *

UNITED STATES PATENT AND TRADEMARK OFFICE
CERTIFICATE OF CORRECTION

PATENT NO.: 5,246,788

DATED: September 21, 1993

INVENTOR(S): James G. Carlson

It is certified that error appears in the above-identified patent and that said Letters Patent is hereby corrected as shown below:

Col. 7, line 60, 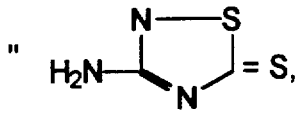 should be 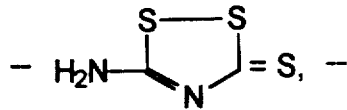

Col. 15, lines 56-57, "Tone™" should be --TONE™--.

Col. 17, line 64, "TO 1" should be --To a 1--.

Col. 21, line 8, 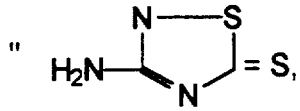 should be 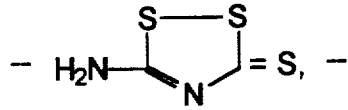

Col. 22, line 13, after "oxide," insert --iron,--.

Signed and Sealed this

Twelfth Day of March, 1996

Attest:

BRUCE LEHMAN

Attesting Officer

Commissioner of Patents and Trademarks